United States Patent [19]
Feng et al.

[11] Patent Number: 6,060,559
[45] Date of Patent: May 9, 2000

[54] CURABLE POLYOLEFIN COMPOSITIONS CONTAINING ORGANOSILICON COMPOUNDS AS ADHESION ADDITIVES

[75] Inventors: Qian Jane Feng, Midland; Robert Edward Kalinowski, Auburn; Kenneth Michael Lee, Bay City; Michael Andrew Lutz; Michael James Owen, both of Midland; Susan Victoria Perz, Essexville; Toshio Suzuki, Midland, all of Mich.

[73] Assignee: Dow Corning Corporation, Midland, Mich.

[21] Appl. No.: 09/148,856

[22] Filed: Sep. 4, 1998

[51] Int. Cl.$^7$ ........................................... C08L 47/00
[52] U.S. Cl. ........................ 525/105; 525/106; 522/148
[58] Field of Search ................... 505/105, 106; 522/148

[56] References Cited

U.S. PATENT DOCUMENTS

| | | | |
|---|---|---|---|
| 2,349,338 | 5/1944 | Clapsadle | 525/75 |
| 2,630,446 | 3/1953 | Gresham | 260/448.8 |
| 2,776,307 | 1/1957 | Abbot | 260/448.8 |
| 3,029,269 | 4/1962 | Abbott | 260/448.8 |
| 3,419,593 | 12/1968 | Wiling | 260/448.2 |
| 3,445,420 | 5/1969 | Kookootsedes | 260/37 |
| 3,644,315 | 2/1972 | Gardner | 260/85.3 |
| 3,989,667 | 11/1976 | Lee | 260/46.5 |
| 4,518,726 | 5/1985 | Kato | 524/32 |
| 4,659,851 | 4/1987 | Plueddemann | 556/431 |
| 4,719,262 | 1/1988 | Plueddemann | 525/105 |
| 4,906,686 | 3/1990 | Suzuki | 524/730 |
| 4,975,488 | 12/1990 | Furukawa | 525/100 |
| 4,981,728 | 1/1991 | Homma | 427/386 |
| 5,002,808 | 3/1991 | Hahn | 427/387 |
| 5,233,006 | 8/1993 | Wolter | 528/32 |
| 5,339,651 | 3/1995 | Gentle | 528/15 |
| 5,397,648 | 3/1995 | Babu | 428/523 |
| 5,424,384 | 6/1995 | Gentle | 528/12 |
| 5,486,565 | 1/1996 | Gentle | 524/730 |
| 5,532,298 | 7/1996 | Monroe | 524/13 |
| 5,595,826 | 1/1997 | Gray | 428/450 |
| 5,683,527 | 11/1997 | Angell | 156/78 |
| 5,928,794 | 7/1999 | Kalinowski et al. | 428/447 |

FOREIGN PATENT DOCUMENTS

| | | |
|---|---|---|
| 286218 | 10/1988 | European Pat. Off. ........ C08C 19/00 |
| 1009204 | 1/1989 | Japan . |
| 3-188166 | 8/1991 | Japan . |
| 5271556 | 10/1993 | Japan . |
| 06116368 | 4/1994 | Japan . |
| 6-279691 | 10/1994 | Japan . |
| 9-316293 | 12/1997 | Japan . |
| 97316293 | 12/1999 | Japan . |
| 450875 | 8/1936 | United Kingdom . |
| WO9621633 | 7/1996 | WIPO . |

OTHER PUBLICATIONS

J. Inorg. Nucl. Chem., 1958, vol. 30, pp. 721 to 727.

*Primary Examiner*—Margaret G. Moore
*Attorney, Agent, or Firm*—Alex Weitz

[57] ABSTRACT

The presence in curable polyolefin compositions of a moisture curable organosilicon compound containing at least one alkenyloxy group bonded to the silicon atoms improves the adhesion to a variety of substrates that is developed during the curing reaction of polyolefin compositions cured by a hydrosilation reaction. The organosilicon compound is preferably a reaction product of ingredients comprising 1) a silane or bis-silylalkane containing at least three silicon-bonded moisture-reactive groups per molecule and 2) an organic compound containing at least one carbinol group and at least one ethylenically unsaturated group.

24 Claims, No Drawings

CURABLE POLYOLEFIN COMPOSITIONS CONTAINING ORGANOSILICON COMPOUNDS AS ADHESION ADDITIVES

BACKGROUND OF THE INVENTION

1. Field of the Invention

This invention relates to curable polyolefin compositions that contain at least one of a specified class of organosilicon compounds to achieve strong bonding to a variety of substrates, particularly glass and metals.

2. Background Information

The properties of polyolefin compositions are desirable for a variety of end use applications, particularly in construction, packaging, automotive and consumer markets. The polyolefin compositions are useful as pressure sensitive adhesives for paper labels, for sealing tires and as adhesives for assembly of single ply roofing. One benefit of polyolefin compositions is the ability to prepare solventless compositions which, following application and curing, exhibit properties similar to those of solvent-based adhesives.

A shortcoming of polyolefin compositions, particularly those that cure by a platinum group metal catalyzed hydrosilation reaction, is their inability to develop strong adhesion to a variety of substrates, particularly glass and certain metals, following curing under commercially feasible conditions of time and temperature. One method for remedying this deficiency is by using primer compositions or adhesion promoting additives containing one or more silanes and/or organopolysiloxanes with a plurality of silicon-bonded hydrolyzable groups and at least one organofunctional substituent that is bonded to silicon through at least one carbon atom.

Primer compositions are applied to substrates to which adhesion is desired prior to application of a curable composition. Adhesion promoters are present as additional ingredients in the curable composition.

U.S. Pat. No. 5,397,648 to Babu et al. describes pressure sensitive compositions for automotive masking tape. The compositions include a moisture curable alpha olefin copolymer containing hydrolyzable or condensable silyl groups.

U.S. Pat. No. 5,002,808 to Hahn and Kreil teaches blending a monomeric or oligomeric precursor of a polyolefin with a silane adhesion aid containing a benzocyclobutane group as a substituent. The monomer or oligomer preferably contains these groups.

U.S. Pat. Nos. 3,424,376 and 3,644,315 to Fujisawa et al. describe sealants for glass containing a hydrocarbon-based polymer with at least one silicon atom bonded to OH or a hydrolyzable group.

U.S. Pat. No. 4,975,488 to Ando et al. describes compositions containing 1) a vinyl polymer containing at least one silicon atom bonded to a hydrolyzable group and 2) a silane or disilane containing at least one OH or a hydrolyzable group. The hydrolyzable group can be alkenyloxy, however no specific silanes of this type are disclosed in the specifications or examples of the patent.

U.S. Pat. No. 4,518,726 to Kato et al. describes metal-containing paint compositions containing a vinyl polymer with at least one silicon-bonded hydrolyzable group. A silicon-containing coupling agent is preferably present to retain metal powder in suspension.

Adhesion promoting additives described in the prior art typically contain at least two functional groups.

U.S. Pat. Nos. 5,233,006, 5,339,738, and 5,532,298 to Egger et al. describe novel polymerizable silanes containing hydrolyzable groups and acrylate or methacrylate groups. The compounds are prepared by reacting a silane containing hydrolyzable groups and an isocyanate group with a hydroxyl- or amino-substituted compound containing at least one C=C group.

U.S. Pat. Nos. 4,659,851, 4,719,262, and 4,906,686 teach reaction products of unsaturated alcohols with alkoxysilanes as adhesion promoting additives for use with organosiloxane compositions.

U.S. Pat. No. 5,424,384, issued to Gentle and Lutz on Jun. 13, 1995 teaches curable organosiloxane compositions containing adhesion promoters that are reaction products of a 1) polyol that is free of ethylenic unsaturation and 2) a silane or disiloxane containing at least three alkoxy groups bonded to each silicon atom. There is no teaching in the patent suggesting the utility of the disclosed adhesion promoters as adhesion promoters for polyolefins.

Japanese Patent Publication (Kokai) No. 09-316293, published on Dec. 9, 1997 describes saturated hydrocarbon polymers curable by a hydrosilation reaction. The polymers contain a silane coupling agent to improve their adhesion. Glycidoxypropyltrimethoxysilane is one of the adhesion promoters disclosed. This publication does not describe adhesion promoters containing silicon-bonded alkenyloxy groups.

One objective of this invention is to define a group of organosilicon compounds that when present in curable polyolefin compositions result in strong cohesive bonding between the cured compositions and a variety of substrates during curing of the compositions.

SUMMARY OF THE INVENTION

The present invention is based on the discovery that the adhesion of curable polyolefin compositions to a variety of substrates can be improved by the addition of certain moisture curable organosilicon compounds. The silicon atoms in these compounds are bonded to at least one alkenyloxy group and at least one moisture-reactive group. The organosilicon compound is preferably prepared by the reaction of an ethylenically unsaturated alcohol containing at least one hydroxyl group with an organosilicon compound containing at least three moisture reactive groups. Organosilicon compounds of this type are described in the aforementioned U.S. Pat. Nos. 4,659,851, 4,719,262, and 4,906,686.

The polyolefin portion of the composition can be cured utilizing any of the following types of reactions:

1) the platinum-catalyzed reaction of silicon-bonded hydrogen atoms with alkenyl radicals present on the polyolefin; 2) the reaction of mercapto groups with alkenyl radicals in the presence of a catalyst that is typically a metal carboxylate of a chelated organometallic compound such as ferrocene; 3) reactions involving ethylenically unsaturated groups present on the polyolefin with the free radicals and cations formed by the decomposition of organic peroxides or the irradiation of photosensitive compounds with ultraviolet light and 4) reactions involving ethylenically unsaturated groups present on the polyolefin that are initiated by high energy particles such as those present in electron beams.

DETAILED DESCRIPTION OF THE INVENTION

This invention provides polyolefin compositions exhibiting improved adhesion, said composition comprising (A) a polyolefin comprising repeating units derived from at least one olefin, wherein each molecule of said polyolefin contains at least two ethylenically unsaturated groups capable of reacting to cure said polyolefin; and (B) An effective amount of an adhesion promoter for said polyolefin; wherein said adhesion promoter comprises at least one organosilicon compound having at least one silicon-bonded alkenyloxy group and at least one silicon-bonded moisture reactive group.

In a preferred embodiment of the present invention the adhesion promoter, referred to hereinafter as ingredient B, is a reaction product of ingredients comprising (B1) at least one organic compound containing at least one carbinol group and at least one ethylenically unsaturated group capable of reacting with either groups or polyolefin(A), or groups on the cure agent therefor, during curing of said polyolefin; and (B2) at least one organosilicon compound selected from the group consisting of silanes and bis-silylalkanes; wherein said organosilicon compound, referred to hereinafter as ingredient B2, contains at least three silicon-bonded moisture-reactive groups and constitutes from 10 to 90 percent of the total weight of said organic and organosilicon compounds; and the concentration of said adhesion promoter is sufficient to impart adhesion to said composition without adversely affecting curing of said composition.

The adhesion promoter preferably constitutes from 1 to 10 percent by weight of said polyolefin composition and is a liquid at 25° C.

As used in this specification the term "cure" means the conversion of a liquid or semi-solid composition to a crosslinked gel, elastomer or resinous material by the reaction of ethylenically unsaturated groups present on the polyolefin referred to as ingredient A of the present compositions with a curing agent. The organic compound, referred to herein as ingredient B1, that is reacted with the organosilicon compound referred to hereinafter as ingredient B2, must be capable of becoming part of the cured polyolefin network.

As used in the present specification, the term "moisture reactive group" includes silicon-bonded functional groups that react in the presence of water to form silanol groups that in turn are capable of reacting with other silanol groups to form siloxane (Si—O—Si) bonds. Examples of moisture reactive groups included but are not limited to alkoxy, isoalkenyloxy, acyloxy, ketoximo, amino and amido.

The preferred curing reaction for the polyolefin is a hydrosilation reaction that preferably involves reaction of an organohydrogenpolysiloxane with alkenyl groups, such as allyl, that are present on the polyolefin. Platinum or a platinum compound is also present as the catalyst for the hydrosilation reaction.

The Adhesion-Promoting Additive (Ingredient B)

The characterizing feature of the present curable polyolefin compositions is the presence as an adhesion promoting additive (B) comprising at least one reaction product of ingredients (B1) and B2) wherein ingredient B1 is a compound containing at least one carbinol group and at least one ethylenically unsaturated group, ingredient B2 is a silane or a bis-silylalkane containing at least three silicon-bonded moisture-reactive groups that are preferably alkoxy or isoalkenyloxy.

Ingredient B1 will be hereinafter referred to as an alcohol and ingredient B2 will hereinafter be referred to as an organosilicon compound.

Suitable unsaturated groups that can be present in ingredient B1 include but are not limited to hydrocarbon groups such as vinyl and allyl in addition to acryloxy and methacryloxy groups.

B1 contains 1) at least one ethylenically unsaturated group that reacts during curing of the present compositions and 2) at least one hydroxyl group. This alcohol can be represented by the formula $R^2(OH)_n$. $R^2$ in this formula is an ethylenically unsaturated radical containing at least 3 carbon atoms and n is an integer with a value of at least 1.

The ethylenically unsaturated radical represented by $R^2$ preferably contains from 4 to 20 carbon atoms, most preferably from 5 to 12 carbon atoms, and is bonded to from 1 to 3 hydroxyl groups. The ethylenically unsaturated portion of $R^2$ can contain atoms other than carbon and hydrogen, so long as these do not interfere with the participation of $R^2$ in the curing reaction of the polyolefin. Most preferably $R^2$ represents an ethylenically unsaturated hydrocarbon radical.

10-Undecen-1-ol, 4-penten-1-ol and dihydrocarveol are particularly preferred alcohols for use as ingredient B1.

The alkoxy or isoalkenyloxy groups that constitute the preferred hydrolyzable groups of ingredient B2 can be replaced by other hydrolyzable groups such as ketoximo or amino so long as these alternative groups do not interfere with curing or storage of the present organosiloxane compositions.

When ingredient B2 is a silane, it can be represented by the general formula $R^1_m SiX_{4-m}$ where $R^1$ represents a substituted or unsubstituted monovalent hydrocarbon radical, X represents a hydrolyzable group and m is 0 or 1.

When the hydrolyzable group represented by X is alkoxy, this group contains from 1 to about 20 carbon atoms, preferably from 1 to 4 carbon atoms, and is most preferably methoxy or ethoxy.

The isoalkenyloxy groups represented by X can be represented by the formula —OCR=CR'R", where R is an alkyl radical, and R' and R" are individually selected from hydrogen atoms and alkyl radicals containing from 1 to 4 or more carbon atoms, with the proviso that the isoalkenyloxy group contains from 3 to 8 carbon atoms. R' and R" can be joined to from a cycloalkylene radical.

Preferably R is methyl, R' and R" are hydrogen and the isoalkenyloxy group is isopropenyloxy.

When $R^1$ in the formula for ingredient B2 contains a substituent, this substituent can be an organofunctional group selected from the group consisting of $CH_2=CH—$, acryloxy, methacryloxy, epoxy, carboxy, amino, amido, acrylamido, methacrylamido,

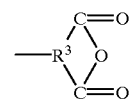

and mercapto where $R^3$ represents a trivalent hydrocarbon radical.

The only proviso for any substituents present on $R^1$ is that they do not interfere with curing of the polyolefin compositions containing the present adhesion promoters.

Silanes preferred for use as ingredient B2 include but are not limited to tetramethoxysilane, tetraethoxysi lane, methyltrimethoxysilane methyltriethoxysilane, 3-glycidoxypropyltrimethoxysilane, 3-methacryloxypropyltrimethoxysilane, hexenyltrimethoxysilane, mercaptopropyl-trimethoxysilane and methyltriisopropenyloxysilane.

Preferred adhesion promoters comprise as ingredient B2 a tetraalkoxysilane selected from tetramethoxysilane and tetraethoxysilane; methyltrimethoxysilane, methyltriethoxysilane, and glycidoxypropyltrimethoxysilane and, as ingredient B1 an ethylenically unsaturated monohydric alcohol containing from 5 to 12 carbon atoms.

The organosilicon compound (ingredient B2) constitutes from 10 to 90 percent, preferably from 30 to 70 percent, of the combined weight of this ingredient and the alcohol (ingredient B1) used to prepare ingredient B.

When ingredient B1 contains one hydroxyl group, the formula for ingredient B can be represented by formula 1 Formula 1 $R^1_m Si(OR^2)_p X_{4-m-p}$, where $R^1$, $R^2$ and m are previously defined and p is 1 or 2. (4−m−p) is preferably at least 2.

If ingredient B1 contains more than one hydroxyl group, ingredient B is typically a mixture of monomeric and oligomeric compounds. One of these species will usually predominate. The predominant species is dependent upon a number of variables, including but not limited to the number of carbon atoms and hydroxy groups present in ingredient B1, the relative amounts of ingredient B1 and B2 used to prepare this ingredient and the conditions under which these ingredients are reacted together.

It should be apparent that Formula 1 does not represent the only formula for ingredient B. If more than one polyhydric alcohol residue is bonded to each silicon atom, the reaction product can be a linear polymer of the general formula $X_{3-m}R^1_m Si[OR^2 OSiR^1_m X_{2-m}]_x OR^2 OSiR^1_m X_{3-m}$ where m is 0 or 1 and x is at least 1.

Preferred embodiments of ingredient B are flowable at 25 to 35° C.

When ingredient B2 is an alkoxysilane, this ingredient can be prepared and isolated prior to reaction with the unsaturated alcohol (ingredient B1) or it can be prepared by reaction of the corresponding chlorosilane with the desired monohydric alcohol in the same reactor in which it is subsequently reacted with ingredient B1. Alternatively, the cholorosilane can be reacted with ingredient B1, following which the remaining silicon-bonded chlorine atoms are converted to alkoxy groups.

Optional Ingredients of the Adhesion Promoter

To enhance the adhesion of cured polyolefin compositions in the presence of water or a high humidity environment, the present adhesion promoter compositions optionally include from 10 to 90 weight percent, preferably from 40 to 70 weight percent, based on total organosilicon compounds, of at least one organosilicon compound (ingredient B3) selected from the group consisting of organosilanes and organopolysiloxanes containing (a) at least one of a first functional group selected from silanol and hydrolyzable groups such as alkoxy or isoalkenyloxy that will not interfere with curing of the polyolefin; and (b) at least one of a second functional group capable of reacting with either groups or polyolefin (A), or groups on the cure agent therefor, during curing of the polyolefin.

Depending upon the reaction used to cure the polyolefin, the second reactive group of ingredient B3 can be a silicon-bonded hydrogen atom, a mercapto group or an ethylenically unsaturated group. Preferred unsaturated groups are vinyl, allyl, 5-hexenyl, 10-undecenyl and other hydrocarbon radicals containing a carbon-to-carbon double bond at a terminal position. The unsaturated group can also contain ether ($R^4$—O—$R^5$—), or ester (—C(O)$OR^4$ or —OC(O)$R^4$) groups, so long as these do not interfere with curing of the polyolefin composition. $R^4$ is a monovalent hydrocarbon radical and $R^5$ is a divalent hydrocarbon radical.

Silanes preferred for use as ingredient B3 have the formula $R^6_q R^7_r Si(OY)_{4-q-r}$. Preferred optional siloxanes contain at least one unit of the formula $R^6_q R^7_r SiO_{(4-q-r)/2}$ and at least one unit of the formula $(OY)_s R^7_t SiO_{(4-s-t)/2}$. In these formulae $R^6$ represents hydrogen or an ethylenically unsaturated group capable of undergoing a hydrosilation reaction. $R^6$ is preferably hydrogen, alkenyl or 3-methacryloxypropyl.

$R^7$ represents an unsubstituted or substituted monovalent hydrocarbon radical, preferably alkyl containing from 1 to 4 carbon atoms; q and s are 1, 2 or 3; r and t are 0, 1, 2 or 3; and the sums of q+r and s+t do not exceed 3, with the proviso that s is 1 when OY represents a hydroxyl group.

OY represents a hydroxyl, an alkoxy group containing from 1 to 4 carbon atoms, an isoalkenyloxy group or other hydrolyzable group that does not interfere with curing of the polyolefin composition.

Preferred embodiments of ingredient B3 are described in U.S. Pat. No. 5,399,651, the relevant sections of which are hereby incorporated by reference.

In addition to silanol and/or hydrolyzable groups and substituents capable of participating in a hydrosilation reaction, ingredient B3 can also contain adhesion promoting reactive groups such as epoxide groups, that are bonded through carbon to the silicon atom of this ingredient, provided that these adhesion promoting groups do not interfere with curing or storage stability of the present silicone compositions.

Preferred epoxy-substituted groups that can be present include 3-glycidoxypropyl and 3,4-epoxycyclohexylethyl.

A preferred silane for use as ingredient B3 is hexenyltrimethoxysilane.

The present composition can also include a catalyst for increasing the rate of reaction of moisture-reactive groups present on ingredients B2 and on any optional silane and/or siloxane present as ingredient B3 in the curable compositions of this invention.

The reaction between ingredients B1, B2, and any optional ingredient B3 is conducted under conditions that are typical for interchange reactions between alcohols and silanes containing alkoxy, isoalkenyloxy or other moisture reactive groups. These reactions are typically conducted under an inert, anhydrous atmosphere such as nitrogen at temperatures from ambient to 200° C. and may employ a catalyst.

Suitable catalysts include, but are not limited to, acids, bases and organotitanium compounds. Sulfonic acids such as trifluoromethanesulfonic acid are preferred catalysts.

The weight of catalyst typically constitutes from about 0.1 to about 5 percent of the combined weight of all reactants.

Reactions involving exchanges of silicon bonded alkoxy and isoalkenyloxy groups generate the alcohol or ketone corresponding to the original silicon-bonded alkoxy or isoalkenyloxy group as a by-product. Because these reactions are often reversible, it is usually desirable to remove this by-product alcohol or ketone by distillation as the reaction progresses.

The course of exchange reactions involving the generation and removal of alcohol and ketone by-product can readily be followed by measuring the amount of by-product collected.

Methanol and ethanol are the lowest boiling alcohols, and are most easily removed during preparation of the present adhesion-promoting additives. It is therefore preferable that the alkoxy groups of the present adhesion additives, represented by $OR_1$ in the foregoing formulae, be methoxy or ethoxy. For the same reason, the isoalkenyloxy group is preferably isopropenyloxy.

The reactants and any catalyst(s) used to prepare ingredient B are heated for a period of time sufficient to achieve a substantially complete reaction, as indicated by the amount of by-product alcohol or ketone collected. This time period is typically from 1 to about 5 hours and the reaction mixture is preferably heated from about 50 to 120° C.

It may be desirable to include in the reaction mixture a liquid diluent that can also function as a solvent for the reactants. Suitable diluents include aliphatic and aromatic hydrocarbons that are liquid at ambient temperature and boil within the range of from 50 to about 200° C. Representative diluents include aliphatic hydrocarbons such as hexane and heptane, and liquid aromatic hydrocarbons such as toluene and xylene.

The present adhesion promoting additives are preferably liquids at 25° C. These additives are particularly useful in polyolefin compositions that cure by a platinum group metal-catalyzed hydrosilation reaction at temperatures below about 150° C. The additives are also useful in polyolefin compositions that cure by the reaction of free radicals with double-bonded carbon atoms. The free radicals can be generated by the heat-induced decomposition of organic peroxides or by photoinitiators that decompose to free radicals in the presence of ultraviolet or other type of radiation.

The concentration of adhesion promoting additive, ingredient B, is sufficient to provide cohesive bonding of the cured composition to the desired substrate. This typically requires at least about 1 weight percent by weight of the adhesion promoter, based on the weight of the curable composition. A concentration of between 1 and 10 weight percent is preferred.

The ability of the polyolefin composition to cure completely under the desired conditions and/or the properties of the cured composition can be adversely affected when the concentration of adhesion promoting additive exceeds about 10 weight percent, based on the weight of the curable composition.

For purposes of the present invention, cohesive bonding is characterized by cohesive failure, which occurs when the strength of the bond between the cured polyolefin and the substrate exceeds the tensile strength of the cured material. In a typical adhesion test, increasing force is applied to the layer of cured material until it is removed from the substrate. Cohesive failure occurs within the body of the cured polyolefin material rather than at the interface between the material and the substrate that the material is in contact with during the curing reaction. At least a portion of the cured material remains adhered to the substrate.

The ingredients of preferred polyolefin compositions suitable for use with the present adhesion promoting additives will now be discussed in detail.

The Polyolefin

The polyolefin, referred to hereinafter as ingredient A, of preferred curable compositions of this invention is the principal ingredient of these compositions. The repeating units of the polyolefin can contain from 2 to 10 or more carbon atoms, preferably from 2 to 6 carbon atoms and can be identical or different. Polymers derived at least in part from butylene and isobutylene are particularly preferred.

The polyolefin can cure to form a crosslinked material by a variety of reactions described hereinbefore involving ethylenically unsaturated groups with a variety of curing agents. The reaction between the polyolefin and curing agent may also require the presence of a catalyst, such as the platinum catalyst required for the reaction of silicon-bonded hydrogen atoms with ethylenically unsaturated functional groups.

A preferred reaction for curing the polyolefin is hydrosilation, the reaction between ethylenically unsaturated groups and silicon-bonded hydrogen atoms.

The polyolefin preferably contains at least two alkenyl radicals in each molecule. Suitable alkenyl radicals contain from 2 to about 10 carbon atoms and are exemplified by but not limited to vinyl, allyl and 5-hexenyl.

The molecular structure of the polyolefin is not critical to the present invention, and will be determined by the physical properties desired in the cured composition. To achieve a useful level of tensile properties in the elastomers and other products prepared by curing the present compositions, the molecular weight of this ingredient should be sufficient to achieve a viscosity at 25° C. greater than about 0.1 Pa.s.

The upper limit for the molecular weight of the polyolefin is not specifically restricted, and is typically limited only by the processability of the curable composition. The viscosity of the polyolefin can range from a pourable liquid to a gum type polymer that is typically characterized by Williams plasticity values.

The molecular weight of the polyolefin is not critical. For convenience in processing the polymer should be a liquid under ambient conditions.

The repeating units present in the polyolefin will depend, at least in part, on the desired physical properties of the cured polymer. The olefin(s) used to prepare the polyolefin include but are not limited to ethylene, propylene, the isomeric butylenes, particularly isobutylene, styrene, and dienes such as butadiene. Ingredient A can also be a copolymer of two or more olefins, such as isobutylene/butadiene copolymers.

Preferred embodiments of ingredient A are isobutylene polymers and copolymers having the general formula I, II or III.

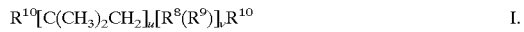

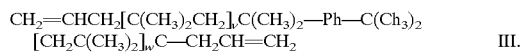

In these formulae $R^8$ represents a trivalent hydrocarbon radical, $R^9$ and $R^{10}$ are monovalent hydrocarbon radicals containing the —CH=CH$_2$ group, $R^{11}$ represents a divalent olefinically unsaturated hydrocarbon radical and Ph represents a phenylene group. The degree of polymerization represented the sums of u+v and v+w are selected to provide a viscosity of at least 100 centipoise (0.1 Pa.s), preferably from 0.1 to 1000 Pa.s., to the polymer. In preferred isobutylene polymers and copolymers u is from 10 to about 1000, preferably from 100 to 500; v is from 0 to 50, preferably from 0 to 10;1 and w is from 5 to 500, preferably from 50 to 250.

Preferred Curing Agents

Preferred curing agents for the polyolefin, ingredient A of the present compositions, are organohydrogensiloxanes, compounds containing at least two mercapto groups per molecule, organic peroxides and compounds generating free radicals or cations upon exposure to ultraviolet radiation or high energy gamma rays.

Particularly preferred curing agents for the polyolefin are organosiloxanes containing at least two silicon-bonded hydrogen atoms. In the presence of a hydrosilation catalyst the silicon-bonded hydrogen atoms in the curing agent undergo an addition reaction, referred to as hydrosilation, with the alkenyl groups in the polyolefin, resulting in crosslinking and curing of the composition.

Specific classes of preferred curing agents include but are not limited to organopolysiloxanes containing from 2 to about 30 siloxane units and at least two silicon-bonded hydrogen atoms.

When the curing agent is an organohydrogenpolysiloxane, it can contain groups other than silicon-bonded hydrogen atoms and saturated or aromatic hydrocarbon radicals, so long as these groups do not interfere with curing of the polyolefin. Suitable groups include but are not limited to silicon-bonded hydrolyzable groups and epoxide groups. Methyl is the preferred hydrocarbon radical.

The curing agent can be a single organohydrogenpolysiloxane or a mixture of two different organohydrogenpolysiloxanes. In preferred mixtures one of the organohydrogenpolysiloxanes is a copolymer consisting essentially of methylhydrogensiloxane and dimethylsiloxane units and the second organohydrogenpolysiloxane is a copolymer consisting essentially of methylhydrogensiloxane units and two types of diorganosiloxane units. One type of diorganosiloxane unit is the dimethylsiloxane unit and the second type of unit has the general formula $(CH_3)(C_aH_{2a+1})SiO$ where the value of a is from 10 to 20. Most preferably the total number of diorganosiloxane units is approximately equal to the number of methylhydrogensiloxane units in the copolymer. The term "approximately equal" implies a numerical difference of not more than +10 units.

If the polyolefin contains only two alkenyl radicals per molecule, the curing agent must contain an average of more than two silicon-bonded hydrogen atoms to achieve a crosslinked structure in the final cured product.

The organic groups in the organohydrogenpolysiloxane are preferably substantially free of ethylenic or acetylenic unsaturation. The molecular structure of the organohydrogenpolysiloxane can be straight chain, branch-containing straight chain, cyclic, or network.

While the molecular weight of the preferred organohydrogenpolysiloxane is not specifically restricted, viscosities in the range of 3 to 10,000 centipoise (0.003 to 10 Pa.s) at 25° C. are preferred.

The concentration of organohydrogenpolysiloxane is sufficient to provide a molar ratio of silicon-bonded hydrogen atoms to alkenyl radicals in the curable composition of from 0.4 to 20. A range of from 0.4 to 4 is preferred.

When the curable composition contains less than 0.4 moles of silicon-bonded hydrogen atoms per mole of alkenyl radicals it may not be possible to achieve the desired physical properties following curing. The physical properties of the cured article may vary with time when this ratio exceeds about 20 moles of silicon-bonded hydrogen per mole of alkenyl radicals.

The Hydrosilation Reaction Catalyst

The reaction between silicon-bonded hydrogen atoms and ethylenically unsaturated groups is catalyzed by metals from the platinum group of the periodic table and compounds of these metals. The metals include platinum, palladium and rhodium. Platinum compounds are preferred based on the high activity level of these catalysts in hydrosilation reactions.

Examples of preferred curing catalysts include but are not limited to platinum black, platinum metal on various solid supports, chloroplatinic acid, alcohol solutions of chloroplatinic acid, and complexes of chloroplatinic acid with liquid ethylenically unsaturated compounds such as olefins and organopolysiloxanes containing ethylenically unsaturated hydrocarbon radicals bonded to silicon. Complexes of chloroplatinic acid with the aforementioned organopolysiloxanes containing ethylenically unsaturated hydrocarbon radicals are described in U.S. Pat. No. 3,419,593, which issued to David N. Willing on Dec. 31, 1968. The relevant portions of this patent are incorporated herein by reference as a teaching of preferred catalysts.

The concentration of hydrosilation catalyst in the present compositions is equivalent to a platinum concentration of from 0.1 to 500 parts by weight of platinum metal, preferably from 1 to 50 parts by weight of platinum metal, per million parts (ppm), based on the weight of ingredient A.

Curing does not proceed satisfactorily at below 0.1 ppm of platinum, while using more than 500 ppm results in no appreciable increase in cure rate, and is therefore uneconomical.

The Platinum Catalyst Inhibitor

Mixtures containing the aforementioned ingredient A, the curing agent, and the hydrosilation catalyst may begin to cure at ambient temperature. To obtain a longer working time or "pot life", the activity of the catalyst under ambient conditions can be retarded or suppressed by addition of a suitable inhibitor.

Known platinum catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol constitute a preferred class of inhibitors that will suppress the activity of a platinum-containing catalyst at 25° C. Compositions containing these catalyst inhibitors typically require heating at temperatures of 70° C. or above to cure at a practical rate.

When it is desired to increase the pot life of a curable composition under ambient conditions, this can be accomplished using an alkenyl substituted siloxane of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of platinum will, in some instances, impart satisfactory storage stability and cure rate. In other instances inhibitor concentrations of up to 500 or more moles of inhibitor per mole of platinum are required. The type and concentration of inhibitor that will provide excellent adhesion in a given composition can readily be determined by routine experimentation and does not constitute part of this invention. It has been noted by the present inventors that certain types of catalyst inhibitors may adversely affect the degree of adhesion that is developed under a given set of curing conditions compared to compositions containing a different type of inhibitor.

Optional Ingredients

The present polyolefin compositions can contain one or more additives that are conventionally present in curable compositions of this type to impart or enhance certain physical properties of the cured composition in addition to adhesion or to facilitate processing of the curable composition.

Typical additives include but are not limited to reinforcing fillers such as finely divided silica; non-reinforcing fillers such as quartz, alumina, mica and calcium carbonate; pigments such as carbon black and titanium dioxide; dyes, flame retardants, and heat and/or ultraviolet light stabilizers.

Preparation of Curable Compositions

The compositions of this invention can be prepared by combining all of the ingredients at ambient temperature. Any of the mixing techniques and devices described in the prior art can be used for this purpose. The particular device used will be determined by the viscosity of the ingredients and the final curable composition. Suitable mixers include but are not limited to paddle type mixers, kneader type mixers, single screw or twin screw extruders, and two- and three-roll rubber mills.

Cooling of the ingredients during mixing may be desirable to avoid premature curing of the composition.

To maximize storage stability of preferred curable polyolefin compositions that cure by a hydrosilation reaction, these compositions are preferably kept in closed containers until used. If greater storage stability is desired, the compositions can be packaged in two or more containers with the compound containing silicon-bonded hydrogen atoms and the platinum group metal catalyst in separate containers.

Cured polyolefin materials prepared using the present compositions can vary in properties from brittle resins to elastomers to gels, and are useful in a variety of end-use applications such as coatings or as molded or extruded articles. Unfilled materials are particularly useful as gels and coatings for protecting delicate electronic devices, such as integrated circuits, from damage by moisture and other materials present in the environment that can adversely affect operation of the device. The compositions can be used to coat either the individual devices or a circuit board containing a number of these devices together with other electronic components.

Compositions containing reinforcing and/or non-reinforcing fillers are useful as adhesives, encapsulants and potting materials.

The present compositions can be applied to substrates by spraying, dipping, pouring, extrusion or by the use of a brush, roller or coating bar. The selection of a particular application method will be determined at least in part by the viscosity of the curable composition. The viscosity of the composition can be reduced using suitable plasticizers or solvents as known in the art.

EXAMPLES

The following examples describe preferred curable compositions of the present invention and should not be interpreted as limiting the scope of the invention defined in the accompanying claims. Unless otherwise specified all parts and percentages in the example are by weight and viscosities were measured at 25° C.

The following procedure was used to prepare the adhesion-promoting additives used in the examples:

A three-necked, round bottom glass reactor was charged with 245.6 parts of tetraethoxysilane as ingredient B2 and 0.45 part of tetrabutyl titanate. The reactor was then equipped with a magnetic stirrer, thermometer, addition funnel, distillation head, condenser, receiver flask cooled with dry ice, dry ice-cooled finger trap, and a tube for introducing nitrogen into the reactor. All the glassware was dried at 120° C. prior to use. 199.6 parts of 10-undecen-1-ol (ingredient B1) was placed in the addition funnel.

The reactor was then flushed using dry nitrogen and the contents were stirred and heated to about 100° C., at which time the alcohol was added slowly over 8 hours. A flow of nitrogen was maintained throughout the reaction. The resultant reaction mixture was allowed to cool to ambient temperature and brought to atmospheric pressure. This reaction product is referred to hereinafter as the adhesion promoter (AP).

Curable polyisobutylene formulations were prepared by blending 1) 76.9 parts of a telechelic allyl-functional polyisobutylene exhibiting a molecular weight of 5000 and available as Epion(R) 5000 from Kanegafuchi Kogyo Kabushiki Kaisha,, Japan; 2) 23.1 parts of an organic plasticizer, a long-chain hydrocarbon oil available from Apollo America Corporation as KP-32; 3) the quantity of adhesion promoter specified in Table 1; and 4) as the curing agent, one of two different organohydrogenpolysiloxanes in an amount sufficient to provide a molar ratio of silicon bonded hydrogen atoms to allyl radicals in the polyolefin of 2:1.

To the resultant mixture was added the curing catalyst, a 0.1 weight percent solution in a liquid hydrogenated polybutene of a complex formed from platinum dichloride and sym-tetramethyldivinyldisiloxane. The complex contained 21 percent platinum, and the amount added was sufficient to provide 15 parts of platinum per million parts of curable composition.

The number average molecular weight of the hydrogenated polybutene was 363.

The organohydrogenpolysiloxanes used were $Me_3SiO(Me_2SiO)_3(MeHSiO)_5SiMe_3$ (Crosslinker I) and $Me_3SiO(Me_2SiO)_5(MeHSiO)_{10}(MeC_{16}H_{33}SiO)_3SiMe_3$ (Crosslinker II) Mixtures containing weight ratios of 1:1, 3:7 and 7:3 of crosslinker I: crosslinker II were also used as indicated in Table 1.

The platinum catalyst inhibitors used were cyclic methylvinylsiloxanes (MVC) at a molar ratio of inhibitor to platinum of 57:1 or methylbutynol (MB) at a molar ratio of inhibitor to platinum of 60:1.

Portions of each of the polyolefin compositions evaluated were applied as 10 mil (0.02 cm)-thick liquid films to the desired substrate using a draw-down bar. The coatings were cured by heating the coated substrates for 90 minutes at 120° C. in a forced air oven and then allowed to age for 7 days under ambient conditions before the adhesion of the coating was evaluated.

The substrates used were glass, milled aluminum (milled Al), bare aluminum (bare Al), and stainless steel (SS).

The adhesion test consisted of attempting to separate the cured coatings from the substrate using the blade of a metal spatula and determining whether the coating could be removed without leaving a residue on the surface. The coating was rated 0 if it could be removed completely without a residue.

If some residue remained on the substrate, the residue was rubbed using a fingertip to determine the pressure required to remove it and rated according to the following scale.

1=light pressure
2=moderate pressure
3=heavy pressure
4=no coating could be removed Example 1

The amount of adhesion promoter (AP), type and amount of catalyst inhibitor (Inhib.) and type(s) of organohydrogensiloxane crosslinker(s) (XL) present in the thirteen compositions evaluated are summarized in Table 1. The relative amounts of the two organhydrogensiloxane crosslinkers in mixtures are expressed as weight ratios.

TABLE 1

| Comp. No. | AP (%) | Inhibitor | XL |
|---|---|---|---|
| 1(c) | None | MVC | I |
| 2(c) | None | MVC | II |
| 3 | 1.5% | MB | I/II(1:1) |
| 4 | 1.5%[a] | MB | I |
| 5 | 1.5%[b] | MB | I |
| 6 | 2.5 | MB | II |
| 7 | 2.5 | MVC | I |
| 8 | 2.5 | MB | I |
| 9 | 2.5 | MB | I/II(1/1) |
| 10 | 2.5 | MB | I/II(7/3) |
| 11 | 2.5 | MB | I/II(3/7) |

TABLE 1-continued

| Comp. No. | AP (%) | Inhibitor | XL |
|---|---|---|---|
| 12 | 5.0 | MB | I |
| 13 | 5.0 | MVC | II |

[a]-Included 0.1% tetrabutyl titanate
[b]-Included 0.05% tetrabutyl titanate
[c]-Comparative composition The results of the adhesion evaluations are recorded in Table 2.

TABLE 2

| Comp. No. | Adhesion Ratings | | | |
|---|---|---|---|---|
|  | Glass | Milled Al | Bare Al | SS |
| 1 | 0 | 0 | 3 | 0 |
| 2 | 0 | 0 | 0 | 0 |
| 3 | 4 | 4 | 4 | 4 |
| 4 | 3 | 2 | 4 | 4 |
| 5 | 3 | 3 | 2 | 4 |
| 6 | 0 | 4 | 4 | 0 |
| 7 | 4 | 4 | 4 | 4 |
| 8 | 4 | 4 | 4 | 4 |
| 9 | 4 | 4 | 4 | 4 |
| 10 | 4 | 2 | 4 | 4 |
| 11 | 4 | 4 | 4 | 4 |
| 12 | 4 | 4 | 4 | 4 |
| 13 | 0 | 4 | 4 | 4 |

Al-Aluminum
SS-Stainless Steel

The data in Table 2 demonstrate that 75 percent of the samples tested demonstrated cohesive failure (a rating of 4). Only two of the samples containing an adhesion promoter of the present invention failed to adhere to the substrate Example 2

This example demonstrates the effect on adhesion of varying the concentration of silicon-bonded hydrogen relative to allyl groups present in the polyisobutylene from the value of 2.5 in Example 1 to the values shown in Table 3. Coatings were prepared and evaluated as described in Example 1 of the present specification. The concentration of adhesion promoter (ingredient A) was 2.5% in all compositions and the organohydrogenpolysiloxane was a 1:1 weight ratio of the two organohydrogenpolysiloxanes (I and II) described in Example 1.

TABLE 3

| Comp. No. | SiH:allyl ratio |
|---|---|
| 14 | 1.25:1 |
| 15 | 1.5:1 |
| 16 | 1.75:1 |
| 17 | 2.25:1 |

The results of the evaluations of the cured coatings corresponding to Compositions 14, 15, 16 and 17 are recorded in Table 4.

TABLE 4

| Comp. No. | Adhesion Ratings | | | |
|---|---|---|---|---|
|  | Glass | Milled Al | Bare Al | SS |
| 14 | 0 | 1 | 4 | 4 |
| 15 | 0 | 4 | 4 | 4 |
| 16 | 0 | 4 | 4 | 4 |
| 17 | 1 | 4 | 4 | 4 |

That which is claimed is:

1. A polyolefin composition exhibiting improved adhesion, said composition comprising
    (A) a polyolefin comprising repeating units derived from at least one olefin wherein each molecule of said polyolefin contains at least two ethylenically unsaturated groups capable of reacting to cure said polyolefin; and
    (B) an effective amount of an adhesion promoter for said polyolefin;
    wherein said adhesion promoter is a reaction product of ingredients comprising
        (B1) at least one organic compound containing at least one carbinol group and at least one ethylenically unsaturated group capable of reacting during curing of said polyolefin; and
        (B2) at least one organosilicon compound selected from the group consisting of silanes and bis-silylalkanes;
    and wherein said compound B2 contains at least three moisture-reactive groups and constitutes from 10 to 90 percent of the total weight of said ingredients.

2. A polyolefin composition according to claim 1 wherein said compound B2 is a silane having the general formula $R^1{}_m SiX_{4-m}$ and said ingredient B1 has the formula $R^2(OH)_n$, where $R^1$ represents a substituted or unsubstituted monovalent hydrocarbon radical; $R^2$ represents an ethylenically unsaturated radical containing at least 3 carbon atoms; X represents a hydrolyzable group; m is 0 or 1; and n is at least 1.

3. A composition according to claim 2 wherein X is selected from alkoxy or isoalkenyloxy groups, $R^2$ is an alkenyl radical containing from 4 to 20 carbon atoms and n is from 1 to 3, inclusive.

4. A composition according to claim 3 where $R^1$ contains at least one organofunctional group selected from the group consisting of $CH_2=CH-$, acryloxy, methacryloxy, epoxy, carboxy, amino, amido, acrylamido, methacrylamido,

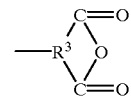

and mercapto, wherein $R^3$ represents a trivalent hydrocarbon radical.

5. A composition according to claim 3 wherein X is selected from the group consisting of methoxy, ethoxy and isopropenyloxy.

6. A composition according to claim 2 wherein said ingredient B2 constitutes from 30 to 70 weight percent of said ingredients.

7. A composition according to claim 1, further comprising a catalytically effective amount of a catalyst for increasing the rate of reaction of said moisture-reactive groups.

8. A composition according to claim 1 wherein said adhesion promoter constitutes from 1 to 10 percent by weight of said composition.

9. A composition according to claim 1 wherein said composition additionally comprises from 10 to 90 weight percent, based on all organosilicon compounds present, of an organosilicon compound (B3) selected from the group consisting of organosilanes and organopolysiloxanes containing at least one first functional group selected from the group consisting of silanol and hydrolyzable groups which will not interfer with the cure of said polyolefin; and at least one second functional group capable of reacting during curing of said polyolefin.

10. A composition according to claim 9 wherein said compound B3 is a silane having the general formula $R^6_q R^7_r Si(OY)_{4-q-r}$, wherein $R^6$ is selected from the group consisting of hydrogen, alkenyl and 3-methacryloxypropyl; $R^7$ represents an unsubstituted or substituted monovalent hydrocarbon radical; q is an integer from 1 to 3, inclusive; r is selected from 0, 1, 2 or 3; the sum of q+r does not exceed 3 and OY is selected from the group consisting of hydroxyl, alkoxy groups having from 1 to 4 carbon atoms and isoalkenyloxy groups.

11. A composition according to claim 9 where said compound B3 is an organopolysiloxane containing at least one unit of the formula $R^6_q R^7_r SiO_{(4-q-r)/2}$ and at least one unit of the formula $(OY)_s R^7_t SiO_{(4-s-t)/2}$; wherein $R^6$ represents hydrogen or an ethylenically unsaturated group capable of undergoing a hydrosilation reaction; $R^7$ represents an unsubstituted or substituted alkyl radical containing from 1 to 4 carbon atoms; q and s are 1, 2 or 3; r and t are 0, 1, 2 or 3; the sums of q+r and s+t do not exceed 3; and OY is selected from the group consisting of hydroxyl, alkoxy groups having from 1 to 4 carbon atoms and isoalkenyloxy groups, with the proviso that s is 1 when OY is hydroxyl.

12. A composition according to claim 9 wherein said compound B3 is hexenyltrimethoxysilane.

13. A composition according to claim 1 wherein the adhesion promoter is a liquid at 25° C.

14. A composition according to claim 1 wherein the repeating units of said polyolefin contain from 2–6 carbon atoms.

15. A composition according to claim 14 wherein said polyolefin is selected from the group consisting of homopolymers and copolymers of isobutylene.

16. A composition according to claim 15 where said polyolefin contains at least two alkenyl radicals and said curable composition additionally comprises a curing agent selected from the group consisting of organohydrogensiloxanes; compounds containing at least two mercapto groups per molecule; organic peroxides, and compounds generating free radicals or cations upon exposure to ultraviolet radiation or high energy gamma rays.

17. A composition according to claim 16 where said curing agent comprises at least one organohydrogensiloxane and said composition further comprises a platinum compound as a hydrosilation catalyst.

18. A composition according to claim 17 where said curing agent comprises a mixture of a first copolymer consisting essentially of methylhydrogensiloxane and dimethylsiloxane units and a second copolymer consisting essentially of methylhydrogensiloxane units and two types of diorganosiloxane units, wherein one type of diorganosiloxane unit is a dimethylsiloxane unit and the second type of diorganosiloxane unit has the general formula $(CH_3)(C_a H_{2a+1})SiO$ where the value of a is from 10 to 20.

19. A composition according to claim 18 wherein the total number of diorganosiloxane units in said first and second copolymers are approximately equal to the number of methylhydrogensiloxane units in said copolymers.

20. A composition according to claim 19 wherein ingredient B2 is an alkoxysilane selected from the group consisting of tetramethoxysilane, tetraethoxysilane, methyltrimethoxysilane, methyltriethoxysilane and glycidoxypropyltrimethoxysilane, and ingredient B1 is an ethylenically unsaturated monohydric alcohol containing from 5 to 12 carbon atoms.

21. A composition according to claim 20 wherein ingredient B2 is tetraethoxysilane and ingredient B1 is 10-undecen-1-ol.

22. A composition according to claim 1 where the said polyolefin contains at least two alkenyl radicals and said curable composition additionally comprises a curing agent selected from the group consisting of organohydrogenpolysiloxanes; compounds containing at least two mercapto groups per molecule; organic peroxides, and compounds generating free radicals or cations upon exposure to ultraviolet radiation or high energy gamma rays.

23. A polyolefin composition exhibiting improved adhesion, said composition comprising A. a polyolefin wherein each molecule contains at least two ethylenically unsaturated groups capable of reacting to cure said polyolefin; and B. an effective amount of an adhesion promoter for said polyolefin;

wherein said polyolefin is selected from the group consisting of homopolymers and copolymers of isobutylene, wherein the adhesion promoter comprises the reaction product of ingredients comprising (B1), an ethylenically unsaturated monohydric alcohol containing from five to fifteen carbon atoms; and (B2), a tetraalkoxysilane wherein the alkoxy groups contains from 1 to 4 carbon atoms, wherein said (B2) constitutes from 10 to 90 weight percent of the combined weight of ingredients (B1) and (B2).

24. A composition according to claim 23 wherein B1 is 10-undecen-1-ol and B2 is tetraethoxysilane.

* * * * *